INVENTORS
LEWIS BALAMUTH
ARTHUR KURIS
BY
ATTORNEY

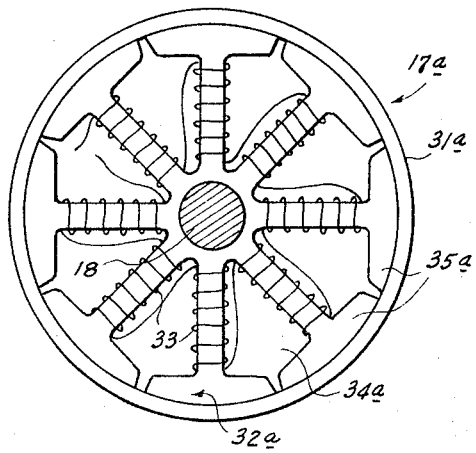

Sept. 13, 1966 L. BALAMUTH ETAL 3,272,682
APPARATUS FOR JOINING THERMOPLASTIC SHEET MATERIAL
WITH ULTRASONIC ROTARY VIBRATORS
Original Filed Aug. 13, 1962 3 Sheets-Sheet 3

INVENTORS
LEWIS BALAMUTH
ARTHUR KURIS
BY
ATTORNEY

United States Patent Office 3,272,682
Patented Sept. 13, 1966

3,272,682
APPARATUS FOR JOINING THERMOPLASTIC SHEET MATERIAL WITH ULTRASONIC ROTARY VIBRATORS
Lewis Balamuth, New York, and Arthur Kuris, Riverdale, Bronx, N.Y., assignors to Cavitron Ultrasonics Inc., Long Island City, N.Y., a corporation of New York
Original application Aug. 13, 1962, Ser. No. 216,644, now Patent No. 3,224,915, dated Dec. 21, 1965. Divided and this application May 18, 1965, Ser. No. 464,594
16 Claims. (Cl. 156—580)

The present application is a division of application Serial No. 216,644, filed August 13, 1962, now Patent No. 3,224,915.

This invention relates generally to the permanent joining of similar or dissimilar sheet materials without the application of external heat.

Thermoplastic sheet materials are generally joined or bonded together by externally applied heat to soften or fuse the thermoplastic materials and permit their coalescence. The use of externally applied heat for the joining together of thermoplastic sheet materials has disadvantages which prohibit the use of this technique in many situations. Thus, the apparatus required for generating the high temperatures necessary for the joining together of thermoplastic materials and for applying the high temperatures to the materials is costly and space consuming, and the heat applied to the materials must be carefully controlled so as to avoid burning or distortion of the materials.

Although it has been proposed to utilize ultrasonic energy in place of externally applied heat for the purpose of joining together thermoplastic sheet materials, the devices presently available for the above purpose are limited in effectiveness and in their range of application.

Most existing ultrasonic joining or sealing devices generally comprise a generator producing an alternating current with a frequency that is in the ultrasonic range, a transducer, preferably of the magnetostrictive type, which converts the high frequency electrical output of the generator into a high frequency longitudinal mechanical vibration or compressional wave, an acoustic impedance transformer connected to an end of the transducer and being operative to amplify the magnitude of the vibrations transmitted longitudinally therethrough, a tool secured to the output end of the transformer for vibration therewith in the direction of the longitudinal axis of the transformer and a hard surface or anvil in a plane perpendicular to the longitudinal axis and against which the tool acts with the thermoplastic sheet materials therebetween. In the bonding or joining together of thermoplastic sheet materials through the use of devices of the type described above, the tool vibrated perpendicular to the planes of the two films or sheets being joined, that is, in the direction of the longitudinal axis of the transducer and transformer, effects the repeated compressing of the thermoplastic material at the indicated ultrasonic or high frequency and thereby generates heat internally within the thermoplastic material so that fusion therebetween results without affecting substantial areas of the sheet materials adjacent the joint. In order to focus and amplify the vibratory energy in the area of the desired joint, the tools employed generally have an active surface of small area and thus can effect sealing or joining together of the sheet materials over only a correspondingly small area. Although bar-shaped tools have been made for producing a relatively elongated seam or seal during each contact with the sheet materials, such sealing tools generally have a maximum length of approximately 2½ inches and a maximum width of approximately ⅛ inch, as tools of greater length and width generally do not sufficiently focus the vibratory energy to effect the desired joining together of the thermoplastic sheet materials.

Although it has been proposed further to employ a tool which is vibrated, as described above, and disposed at a fixed location past which the sheets of thermoplastic material are conveyed, so that a continuous seam or joint is formed parallel to the direction of movement of the sheet materials, the pressures that can be exerted by the vibrated tool upon the sheet materials against the anvil or supporting surface are limited by the necessity for moving the sheet materials relative to the stationary tool, particularly when the sheet materials are in the form of thin films liable to tear when subjected to a substantial pulling force. Further, where the sheet materials are to be joined together at lines or seams extending transversely with respect to the direction of movement of the sheet materials, as well as along seams extending parallel to the direction of movement, the existing ultrasonic sealing or joining devices require that the movement of the sheet materials be intermittent so that the sheet materials are at rest when being joined together along each of the transversely extending seams.

Accordingly, it is an object of this invention to provide improved devices operative to join together thermoplastic sheet materials while the latter are continuously advanced or moved past the device.

In accordance with an important aspect of this invention, a device for joining thermoplastic sheet materials includes a rotary vibrator mounted adjacent the path of travel of the moving sheet materials and having one or more sealing tools at its periphery for rolling contact with the sheet materials against a back-up or pressure roller, and radially directed mechanical vibrations are generated within the rotary vibrator to be effective at the peripheral sealing tool or tools thereof in rolling contact with the sheet materials to cause joining together of the latter.

In devices embodying this invention, the peripheral sealing tool or tools of the rotary vibrator intended for rolling contact with the moving sheet materials may extend circumferentially or axially, or both circumferentially and axially, on the rotary vibrator so as to join together the sheet materials along seams or lines extending parallel to the direction of movement of the sheet materials or transversely with respect to such direction of movement, or both parallel and transversely with respect to the direction of movement, respectively. Since the rotary vibrator makes rolling contact with the sheet materials to be joined together, the rotary vibrator impose insignificant resistance to the travel of the sheet materials so that the latter may be in the form of thin films without the danger that such thin films will be torn by the resistance to movement thereof imposed by the vibrated sealing or joining tool or tools. Further, the provision of a rotary vibrator in rolling contact with the moving sheet material makes it possible to join together the latter along seams extending transversely with respect to their direction of movement without requiring the arresting of the movement of the sheet materials during the forming of such seams.

A further object of the invention is to provide devices for joining together thermoplastic sheet materials through the use of rotary vibrators which are constructed so that radially directed vibrations of magnified amplitude appear at the peripheral sealing tool or tools of the rotary vibrator intended for rolling contact with the moving sheet materials.

The above, and other objects, features and advantages of the invention, will be apparent in the following detailed description of illustrative embodiments thereof which is to be read in connection with the accompanying drawings forming a part hereof, and wherein:

FIG. 3 is a view similar to that of FIG. 2, but showing a modification of the construction of the rotary vibrator;

FIG. 4 is a perspective view of another embodiment of the invention having a rotary vibrator adapted to join together the thermoplastic sheet materials along lines or seams extending transversely with respect to the direction of the movement of the sheet materials;

Figure 1:
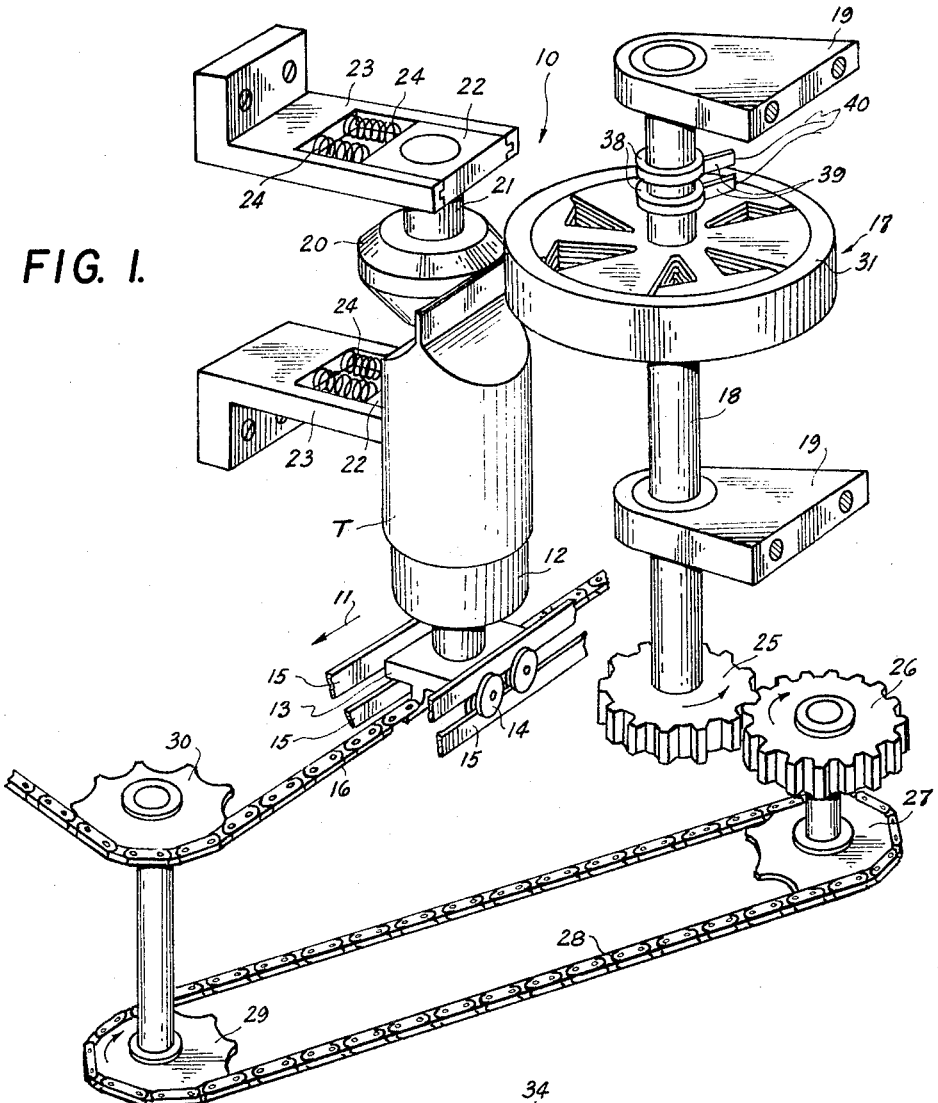
FIG. 1 is a perspective view of a device embodying this invention for joining together sheet materials along lines or seams parallel to the direction of movement of the latter.

Referring the drawings in detail, and initially to FIG. 1 thereof, it will be seen that the device embodying this invention, as there illustrated and generally identified by the reference numeral 10, is intended to join together thermoplastic sheet materials along lines or seams which extend parallel to the direction of the continuous movement of the sheet materials past the device. Further, the device 10 is shown, merely by way of example, employed for the purpose of sealing the upper ends of thermoplastic tubes T as such tubes are continuously advanced past the device 10 in the direction of the arrow 11. Each of the tubes T may be carried by a mandrel 12 on a carriage 13 having wheels 14 riding on guide tracks 15, with movement of each carriage being effected by a suitably driven chain 16 having the carriages 13 secured thereto at spaced apart locations.

The device 10 generally includes a rotary vibrator 17 mounted on a vertical shaft 18 which is journalled in bearing supports 19 at one side of the path of travel of the tubes T so that the rotary vibrator is substantially at the level of the upper ends of the successive tubes which are to be closed or sealed by the device 10. The device 10 further generally includes a back-up wheel 20 mounted on a shaft 21 parallel to the shaft 18 and being disposed at the level of the rotary vibrator 17, but at the opposite side of the path of travel of the successive tubes T so that, as a tube passes the device 10, the upper end portion of the tube is progressively flattened between the peripheries of the rotary vibrator 17 and backup wheel 20 in rolling contact therewith. In order to provide the requisite contact pressure for flattening the upper end portion of each tube between rotary vibrator 17 and back-up wheel 20, the shaft 21 supporting the latter preferably has its opposite ends journalled in slides 22 which are movable relative to support brackets 23 in directions extending transversely with respect to the direction of movement of the successive tubes, and springs 24 act between the slides 22 and the related support brackets 23 to yieldably urge backup wheel 20 toward rotary vibrator 17.

Further, as shown on FIG. 1, the rotary vibrator 17 may be rotated synchronously with the movement of the successive tubes T so as to ensure that there is pure rolling contact between the rotary vibrator and each tube during the sealing or closing of the upper end of the latter. In order to effect such synchronous rotation of vibrator 17, a spur gear 25 fixed on shaft 18 meshes with a spur gear 26 rotatably coupled with a sprocket 27 which is driven through a chain 28 also running around a sprocket 29 which is, in turn, rotatable with a sprocket 30 engaged by the chain 16.

In accordance with the present invention, the sealing tool of device 10 is constituted by a metal rim or ring 31 forming the periphery of rotary vibrator 17, and radially directed mechanical vibrations are generated within the rotary vibrator 17 and transmitted to the peripheral ring tool 31 in rolling contact with the flattened upper end portion of each tube T to cause joining together of the thermoplastic sheet material constituting the flattened upper end portion of each tube.

Figure 2:
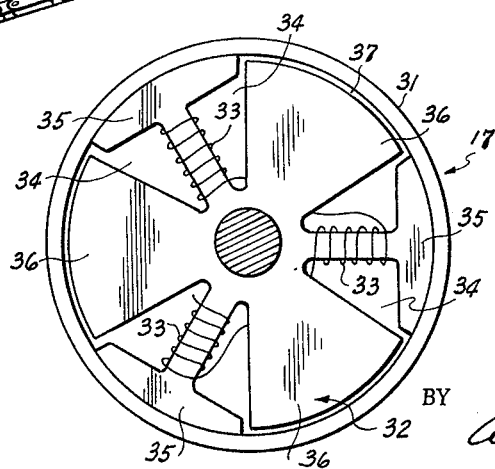
FIG. 2 is an elevational view of a rotary vibrator included in the device of FIG. 1.

As shown particularly in FIG. 2, when it is desired to produce large amplitude radially directed vibration at the peripheral ring tool 31, the rotary vibrator 17 may include a body formed of an axial series of generally circular laminations 32 which are stamped or otherwise fabricated from a suitable magnetostrictive metal, such as, nickel, Permanickel, Permendur, or other metals which have a high tensile strength and are highly magnetostrictive in character, so that the laminations 32 forming the body of the radial vibrator will vibrate radially to a maximum degree when subjected to the influence of alternating electromagnetic fields established by the supplying of biased alternating current to windings 33 provided directly on the magnetostrictive body, as hereinafter described in detail. The laminations 32 may be brazed, soldered or otherwise secured on the supporting shaft 18, and each of the laminations is formed with generally radially extending slots, as at 34 on FIG. 2, so as to divide each lamination 32 into a circular series of sector-shaped portions 35 and 36.

The radial slots or cutouts 34 are dimensioned and disposed so that the sectors or portions 35 and 36, which are arranged alternately around the lamination, have relatively small and relatively large masses, respectively. Further, each lamination 32 has an odd number of each of the different sectors or portions 35 and 36, for example, three sectors 35 of relatively small mass and three sectors 36 of relatively large mass, as in the illustrated embodiment, so that each sector 35 of relatively small mass is diametrically opposed by a sector 36 of relatively large mass.

In the radial vibrator 17 of FIGS. 1 and 2, the energizing windings 33 are wound around the relatively narrow stems of the sectors 35 of small mass of a group or stack of the laminations 32 which are axially superposed so that the high frequency alternating electromagnetic field established by the passage of a biased, suitable high frequency alternating current through the windings 33 induces or generates radially directed vibrations in the sectors 35 at the fundamental mode of radial vibration of the body constituted by the laminations.

Since the diametrically opposed sectors or portions 35 and 36 of each lamination have different masses, balancing of the momenta requires that the average radial velocity in the sector 35 of small mass will be greater than the average radial velocity in the diametrically opposed sector 36 of large mass and, therefore, the amplitude of vibration in the radial direction at the outer end of each of the sectors 35 of small mass is substantially greater than, or magnified with respect to the amplitude of radially directed vibration at the outer end of each sector 36 of large mass. Further, since the sectors 35 and 36 are arranged alternately around each lamination 32, the net center of gravity of each lamination, and hence of the body constituted by a stack of such laminations, remains at the central axis of the radial vibrator 17, thereby to avoid gross vibrations or dynamic unbalance of the shaft 18 when rotated with the rotary vibrator 17 thereon.

Further, the peripheral ring tool 31 is dimensioned so that its fundamental mode of radial vibration is equal to that of the body of the radial vibrator constituted by the stack of laminations 32, and the ring tool 31 is brazed, soldered or otherwise rigidly secured to the outer ends of the sectors 35 so that the radial vibrations of magnified amplitude are transmitted directly from the sectors 35 to the ring tool 31 and the latter is made to vibrate radially, around its complete circumference, at the same frequency and amplitude as the sectors 35. In order to avoid damping of such radial vibrations of the ring tool 31 by the sectors 36 which vibrate with a relatively smaller amplitude, a clearance 37 (FIG. 2) is preferably provided between the ring tool 31 and the outer edges of sectors 36 of relatively large mass.

Since the vibrator 17 is rotated, as described above, the biased, high frequency alternating current may be supplied to the energizing or exciting windings 33 through slip rings 38 (FIG. 1) carried by an insulating collar on the shaft 18 and being connected by suitable conductors to the windings 33, and through stationary brushes 39 which engage the slip rings 38 and are connected, as by conductors 40, to a suitable generator or other source (not shown) of the necessary biased, high frequency alternating current.

It is apparent that, as the upper end portion of each tube T passes between ring tool 31 and the periphery of backup wheel 20 and is flattened by the contact pressure therebetween, there is no relative sliding or movement in the direction of travel of the tube between the latter and the peripheral surface of tool 31. Further, at any instant, the peripheral surface of the tool 31 in rolling contact with the flattened upper end portion of the tube T is being vibrated radially, that is, perpendicular to the planes of the sides of the flattened upper end portion of the tube, so that the flattened end portion of the tube is fused or sealed shut by reason of the repeated compressing of the thermoplastic material at the indicated ultrasonic or high frequency which generates heat internally within the thermoplastic material.

The width of the seam or seal thus produced may be determined by providing the periphery of the ring tool 31 of rotary vibrator 17 with the requisite axial dimension, or by providing the backup wheel 20 with a peripheral surface having an axial dimension corresponding to the desired width of the seam or seal, as shown on FIG. 1.

Although the device 10 embodying this invention is shown in FIG. 1 applied to the sealing or closing of the ends of thermoplastic tubes, thereby to form containers or the like from such tubes, and the tubes are conveyed successively past the device 10, it is obvious that the latter may be applied to the formation of a continuous seal or seam extending parallel to the direction of movement of one or more webs or films of thermoplastic material. Thus, two superposed webs of thermoplastic material may be passed between rotary vibrator 17 and backup wheel 20 of device 10 so that the latter will continuously join together the two superposed webs along the adjacent longitudinal edges of the latter. Alternatively, a single web of thermoplastic material may be folded about its longitudinal medial line so that its longitudinal edges are superposed and permanently joined or sealed together by passage between the rotary vibrator 17 and backup wheel 20 of device 10.

Figure 9:
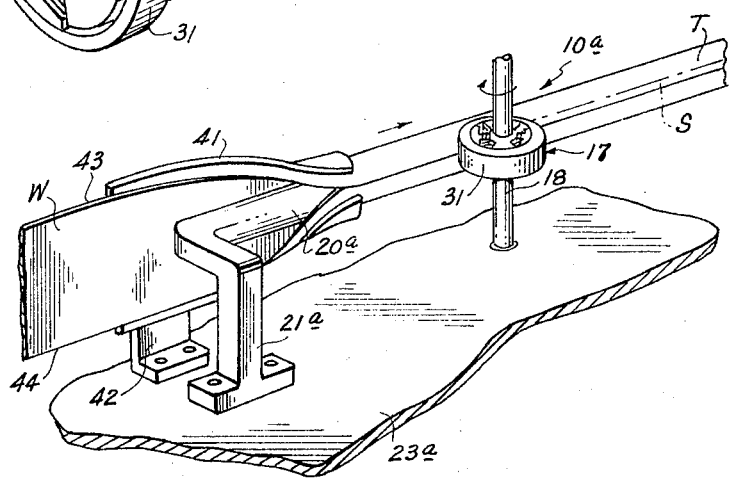
FIG. 9 is a perspective diagrammatic view illustrating a device embodying the invention for forming plastic tubing from thermoplastic sheet material.

A particular use of a device embodying the present invention for producing a continuous longitudinal seam is illustrated in FIG. 9, where the device 10a includes a rotary vibrator 17 having a peripheral ring tool 31 and being mounted on a rotated shaft 18, as in the previously described device 10, but the backup wheel 20 of the latter is replaced by an elongated cylindrical mandrel 20a having an offset bracket 21a formed integrally with one end thereof for rigid mounting on a support plate or base 23a. A suitably curved guide 41 also mounted on the base 23a by a bracket 42 is associated with the mandrel 20a to cause a continuous strip or web W of thermoplastic material to curl or roll transversely with respect to its direction of movement parallel to the longitudinal axis of mandrel 20a. Thus, the web W is made to envelop the mandrel 20a during movement along the latter and the longitudinal edge portions 43 and 44 of the web W are overlapped upon reaching the location of rotary vibrator 17. The rotary vibrator 17 is located relative to mandrel 20a so that its peripheral ring tool 31, which is radially vibrated as previously described herein, effects rolling contact with the overlapped edge portions of the web backed up by the mandrel 20a, whereby the high frequency radial vibrations cause fusing of the overlapped edge portions to form a continuous longitudinal seam S. Thus the continuous web W of thermoplastic material is formed into an endless tube T which is withdrawn lonigitudlnally from the mandrel by suitable means (not shown).

If it is not necessary to effect magnification of the amplitude of the radially directed vibrations generated in the rotary vibrator, then the latter may have the form illustrated in FIG. 3, wherein the rotary vibrator 17a includes the ring tool 31a which is brazed or soldered to the outer periphery of an axially aligned stack of a magnetostrictive laminations 32a secured on the shaft 18 and each having cutouts 34a between which a series of sectors 35a are defined, with all of the sectors 35a having the same configuration or mass, and with the energizing windings 33 being wound around the relatively thin stems of all the sectors 35a of the laminations included in the stack. Since the amplitude of the radial vibration in uniform at the outer edge of each of the sectors 35a, the ring tool 31a may be secured to all of the sectors and thereby have the radial vibrations transmitted thereto along its entire circumference, so that the radial width or thickness of the ring tool 31a may be reduced.

Although the embodiments of the invention described above with reference to FIGS. 1, 2, 3 and 9 operate to join together thermoplastic matetrials along seams extending parallel to the direction of movement thereof, the invention is particularly advantageous applied to the joining together of continuously conveyed thermoplastic material along seams extending more or less transversely with respect to the direction of movement. Thus, as illustrated on FIG. 4, a device 10b may be provided, in accordance with this invention, for joining together the two layers $L_1$ and $L_2$ of a flattened tube T of thermoplastic material along seams S (represented in broken lines) extending transversely with respect to the longitudinal axis of the flattened tube T and being spaced apart in the direction of that axis. The device 10b generally includes a rotary vibrator 17b and a backup roller or cylinder 20b which are suitably rotated in opposite directions about parallel axes, and the flattened tube T of thermoplastic material is continuously advanced in the direction of the arrow 11 through the nip between vibrator 17b and cylinder 20b.

The rotary vibrator 17b is formed of a stack of generally circular laminations 32b stamped or otherwise fabricated from a magnetostrictive metal and which are brazed, soldered or otherwise secured on the supporting shaft 18b. The stack of laminations 32b has an axial length at least as large as the length of each transverse seam S to be formed across the flattened tube T. Further, in order to provide radial vibrations of magnified amplitude for effecting the joining together of the layers $L_1$ and $L_2$ along the transversely extending seams S, each lamination 32b may have a configuration similar to that shown on FIG. 2, and thus is formed with cutouts 34b dimensioned and disposed so that the sectors or portions 35b and 36b defined between the cutouts and arranged alternately around the lamination have relatively small and relatively large masses, respectively, with each sector 35b of small mass being diametrically opposed by a sector 36b of large mass. The energizing windings 33b are wound around the sectors 35b of small mass of the stack of laminations forming the radial vibrator 17b so that the high frequency alternating electromagnetic fields established by the passage of a biased suitable high frequency alternating current through the windings 33b induces or generates radially directed vibrations in the sectors 35b at the fundamental mode of radial vibration of the body constituted by the laminations 32b.

As in the radial vibrator 17 described above with reference to FIG. 2, the amplitude of the vibrations in the radial direction at the outer end of each sector 35b of small mass is substantially greater than, or magnified with respect to the amplitude of the radially directed vibrations at the outer end of each sector 36b of large mass.

In the radial vibrator 17b the laminations 32b are all arranged with their respective sectors 35b and 36b in axial alignment with each other, and the sealing tools 31b are in the form of axially elongated metal bars which are brazed, soldered or otherwise rigidly secured to the outer end edges of the aligned sectors 35b of small mass of the series of laminations. Thus, the sealing tool 31b are vibrated in the radial direction with the uniform large amplitude of vibration at the outer ends of the sectors 35b of small mass.

It will be apparent that, as the flattened tube T is continuously advanced between rotary vibrator 17b and backup cylinder 20b and the rotary vibrator and backup cylinder are rotated with a peripheral speed equal to the speed of advancement of the flattened tube, the sealing tools 31b successively engage the flattened tube T along lines extending transversely across the tube and being spaced apart along the latter by distances equal to the circumferential distance on the rotary vibrator between the adjacent sealing tools. By reason of the high frequency and high amplitude radial vibrations imparted to each of the sealing tools 31b, the layers $L_1$ and $L_2$ of thermoplastic materials are joined together along the transversely extending zones of contact of the successive sealing tools with the flattened tube against the backup cylinder 20b, thereby to form the seams S. If desired, a rim or radial projection 45 may be provided along one longitudinal edge of each sealing tool 31b, which rim or projection 45 may be relatively sharp to cooperate with the backup cylinder 20b in cutting through the flattened tube T along a transversey extending line C at one margin of each seam S. Alternatively, the rim or projection 45 may be relatively blunt so that it cooperates with the backup cylinder in merely greatly reducing the thickness of the flattened tube along a margin of each seam so that the successive sections of the flattened tube defined between the adjacent seams S may be pulled apart from each other and thereby form individual plastic bags.

It will be apparent that, with the device 10b embodying the present invention, the transversely extending seams S can be formed to join together the layers $L_1$ and $L_2$ while the flattened tube is being continuously advanced, as distinguished from the previously provided bar-shaped sealing tools which required the intermittent advancement of the material being ultrasonically joined or sealed along transversely directed seams.

Figure 5:
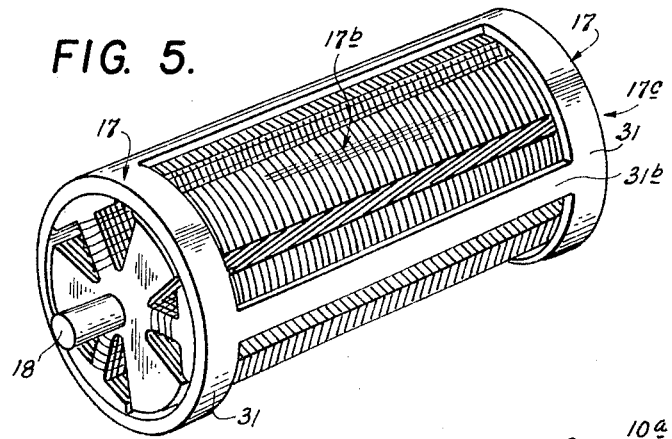
FIG. 5 is a perspective view of a rotary vibrator similar to that included in the device of FIG. 4, but being adapted to join together the sheet materials along seams extending both in the direction of movement of the sheet materials and transversely with respect to that direction.
Figure 6:
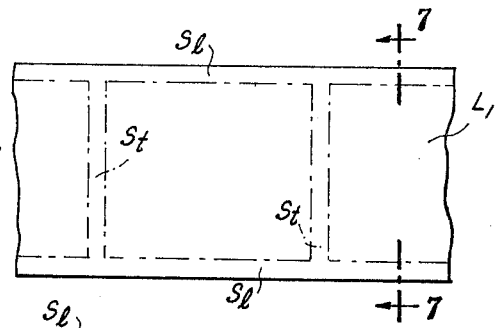
FIG. 6 is a diagrammatic view illustrating the seams along which the sheet materials are joined together by the rotary vibrator of FIG. 5.

It is also to be noted that, in accordance with the present invention, two layers of thermoplastic material may be joined together during their continuous movement along seams that extend both parallel to the direction of such movement and transversely with respect to the direction of movement. Thus, as shown in FIG. 5, a rotary vibrator 17c for use in the ultrasonic sealing of thermoplastic materials may include a component 17b constituting a rotary vibrator of the type described above with reference to FIG. 4, and two components 17 disposed at the opposite ends of the components 17b and each constituting a rotary vibrator of the type described above with reference to FIGS. 1 and 2. The three components 17 and 17b are mounted on a common supporting shaft 18 for simultaneous rotation with the latter. When the rotary vibrator 17c of FIG. 5 is substituted for the rotary vibrator 17b of FIG. 4, and two sheets or layers $L_1$ and $L_2$ of plastic material are advanced continuously between the rotated vibrator 17c and the back-up cylinder, then such layers are simultaneously and continuously joined together along longitudinally extending seams $S_l$ and along transversely extending seams $S_t$, as indicated by the broken lines on FIG. 6, by the sealing tools 31 and 31b, respectively. Thus, the two layers $L_1$ and $L_2$, which were originally independent of each other, are joined together ultrasonically to form a chain of bags or compartments in which bulk materials or the like may be accommodated. It is apparent that the tools 31b of the component 17b of rotary vibrator 17c may also be formed with cutting or severing edges, as described above with reference to FIG. 4, so that the successively formed bags may be conveniently separated from each other.

Figure 8:
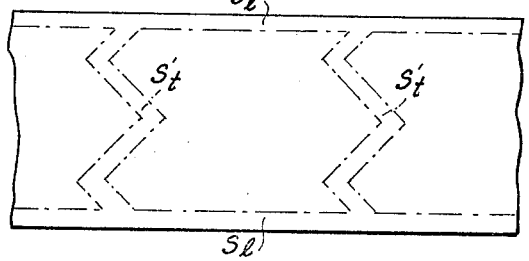
FIG. 8 is a view similar to that of FIG. 6, but showing another configuration of the seams along which the sheet materials may be joined together by a device embodying this invention.
Figure 7:
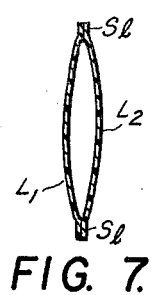
FIG. 7 is a sectional view taken along the line 7—7 on FIG. 6.

Although the rotary vibrators of FIGS. 4 and 5 for forming transversely extending seams embody straight sealing tools 31b, so that the corresponding transverse seams are also straight, it is to be noted that rotary vibrators embodying this invention may be provided to form generally transversely extending seams of zig-zag or other irregular configuration, as at $S'_t$ on FIG. 8. Such rotary vibrators may be provided merely by suitably angularly offsetting the successive laminations of the rotary vibrator or component 17b so that the outer ends of the tool carrying sectors follow a line corresponding to the desired shape of the seam, and the sealing tool then secured to the outer ends of such sectors is given a corresponding irregular configuration.

Generally speaking, the rotary vibrators embodying this invention are best operated at a frequency between 10,000 and 100,000 cycles per second for the purpose of sealing or joining together thermoplastic sheet materials, and with amplitudes of radial vibration, at the sealing tools, within the range from approximately .0001 to .005 inch so as to ensure the introduction of vibratory energy sufficient to form a secure bond between the sheet materials.

Although the invention has been described with respect to the joining together of thermoplastic films or sheets, the rotary vibrators may be also used for the bonding or joining together of synthetic fabrics, of thermoplastic fibers, or for the joning together of thermoplastic coated papers and foils. Further, the invention can be employed for joining together thermoplastic sheet materials having coatings of contaminants or other materials on the surfaces thereof, for exampe, oil, grease, magnetic recording coatings, inks or photographic emulsions.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. Apparatus for joining together overlapped sheet materials, at least one of which is thermoplastic, comprising
    (A) back-up means engageable with the overlapped sheet materials at one side of the latter during the continuous advancement of the sheet materials; and
    (B) a rotary vibrator mounted at the other side of the sheet materials for rotation about an axis extending transversely with respect to the direction of said continuous advancement and including
        a. a magnetostrictive body of generally circular cross-section, b. windings on said body to establish alternating electromagnetic fields producing radial vibrations in said body at the fundamental mode of vibration of the latter, and c. at least one tool member joined to the periphery of said body for radial vibration with the latter and for rolling contact with the overlapped sheet materials against said back-up means.

2. Apparatus as in claim 1:
wherein said tool member is constituted by a rigid ring extending circumferentially on said body in a plane perpendicular to said axis of rotation of the vibrator so that the overlapped sheet materials are joined together along a seam extending parallel to said direction of advancement thereof.

3. Apparatus as in claim 1:
wherein said tool member is elongated and extends generally parallel to said axis of rotation of the vibrator so that the overlapped sheet materials are joined together along seams extending transversely with respect to said direction of advancement thereof.

4. Apparatus as in claim 1:
wherein a plurality of tool members are provided on the periphery of said body respectively extending circumferentially in a plane perpendicular to said axis of rotation of the vibrator and generally parallel to said axis of rotation so that the overlapped sheet materials are joined together along seams extending parallel and transversely, respectively, with respect to said direction of advancement of the sheet materials.

5. Apparatus as in claim 1;
wherein said body of the vibrator consists of an axially arranged stack of laminations each having cutouts defining sectors therebetween, said tool is joined to the outer ends of at least ceratin sectors of said laminations, and said windings are mounted on at least certain of said sectors.

6. Apparatus as in claim 1:
wherein said body has diametrically opposed sectors of relatively small and large mass, respectively, thereby to provide radial vibrations of magnified amplitude at the outer ends of said sectors of small mass; and
wherein said tool member is joined to the periphery of the body only at the outer end of at least one of said sectors of small mass.

7. Apparatus as in claim 1:
wherein said body has diametrically opposed sectors of relatively small and large mass, respectively, thereby to provide radial vibrations of magnified amplitude at the outer ends of the sectors of small mass; and
wherein said tool member consists of a ring extending circumferentially around said body and joined only to said outer ends of said sectors of small mass.

8. Apparatus as in claim 1:
wherein said body has diametrically opposed sectors of relatively small and large mass, respectively, thereby to provide radial vibrations of magnified amplitude at the outer peripheral surface of said sectors of small mass; and
wherein each tool member consists of an elongated bar extending generally axially along said outer peripheral surface of one of said sectors of small mass.

9. Apparatus as in claim 1:
wherein said body consists of an axially arranged stack of laminations each having cutouts defining diametrically opposed sectors of relatively large and small mass, respectively, thereby to provide radial vibrations of magnified amplitude at the outer peripheral edges of said sectors of small mass;
and wherein said tool member is joined to the periphery of the body only at said outer peripheral edges of at least certain of said sectors of small mass.

10. Apparatus as in claim 9:
wherein the respective sectors of large and small mass of said laminations are axially aligned with each other throughout said stack so that said outer peripheral edges of the sectors of small mass form axially extending zones of high amplitude vibration at the periphery of said body.

11. Apparatus as in claim 10:
wherein said tool member extends axially on said body and is joined to said outer peripheral edges of the sectors of small mass forming one of said zones of high amplitude vibration at the periphery of the body.

12. Apparatus as in claim 9:
wherein the respective sectors of large amplitude and small mass of said laminations are angularly displaced relative to each other so that said outer peripheral edges of the sectors of small mass form irregularly shaped zones of high amplitude vibration extending generally axially on the periphery of said body; and
wherein said tool member has a shape corresponding to that of one of said irregularly shaped zones and is joined to said outer peripheral edges of the sectors of small mass forming said one zone.

13. A rotary vibrator for applying high frequency vibrations to a moving material surface comprising (a) a magnetostrictive body of generally circular cross-section mounted for rotation about an axis which is concentric with respect to said circular cross-section and which extends transversely with respect to the direction of movement of the material surface, said body consisting of an axially arranged stack of laminations each having cutouts defining sectors therebetween, (b) windings on at least certain of said sectors of the laminations to establish alternating electromagnetic fields producing radial vibrations in said body at the fundamental mode of vibration of the latter, and (c) at least one tool member joined to the periphery of said body at the outer ends of at least certain sectors of said laminations for radial vibration with the latter and for rolling contact with the moving material surface so as to subject the latter to high frequency vibrations in directions perpendicular to such surface.

14. A rotary vibrator as in claim 13, wherein said tool member is in the form of a rigid annular member extending circumferentially on said body.

15. A rotary vibrator as in claim 13, wherein said tool member is elongated and extends generally axially on said body.

16. A rotary vibrator as in claim 13; wherein a plurality of tool members are provided on the periphery of said body and extend both circumferentially and axially thereon.

References Cited by the Examiner
UNITED STATES PATENTS
3,201,864   8/1965   Jones et al. _____ 228—1 XR
FOREIGN PATENTS
703,756   2/1954   Great Britain.

EARL M. BERGERT, *Primary Examiner.*
P. DIER, *Examiner.*